(12) United States Patent
Otsuki et al.

(10) Patent No.: US 6,879,077 B2
(45) Date of Patent: Apr. 12, 2005

(54) MOTOR, MOTOR STATOR AND METHOD FOR MANUFACTURING THE SAME

(75) Inventors: Noboru Otsuki, Nagano (JP); Masashi Takahashi, Nagano (JP); Takashi Ikegami, Nagano (JP)

(73) Assignee: Sankyo Seiki Mfg. Co., Ltd., Nagana (JP)

( * ) Notice: Subject to any disclaimer, the term of this patent is extended or adjusted under 35 U.S.C. 154(b) by 99 days.

(21) Appl. No.: 10/256,230

(22) Filed: Sep. 26, 2002

(65) Prior Publication Data

US 2003/0062795 A1 Apr. 3, 2003

(30) Foreign Application Priority Data

Oct. 2, 2001 (JP) .......................................... 2001-306897
Nov. 15, 2001 (JP) .......................................... 2001-350714

(51) Int. Cl.[7] .......................... H02K 19/00; H02K 19/26
(52) U.S. Cl. .......................................... 310/202; 310/198
(58) Field of Search .................................. 310/134, 140, 310/141, 146, 150, 179, 184, 198, 202, 203, 208, 254, 216, 217, 258, 259

(56) References Cited

U.S. PATENT DOCUMENTS

| | | | |
|---|---|---|---|
| 6,362,553 B1 * | 3/2002 | Nakahara et al. ........... | 310/254 |
| 6,495,936 B2 * | 12/2002 | Kikuchi et al. ............... | 310/58 |
| 6,555,942 B1 * | 4/2003 | Hsu ............................. | 310/208 |
| 6,590,310 B2 * | 7/2003 | Takano ........................ | 310/254 |
| 6,683,397 B2 * | 1/2004 | Gauthier et al. ........... | 310/68 B |
| 6,713,915 B2 * | 3/2004 | Takahashi et al. ............ | 310/89 |
| 2003/0062795 A1 * | 4/2003 | Otsuki et al. ............... | 310/208 |

* cited by examiner

Primary Examiner—Darren Schuberg
Assistant Examiner—Heba Elkassabgi
(74) Attorney, Agent, or Firm—Hogan & Hartson, LLP (57) ABSTRACT

A motor has a stator core having a plurality of salient poles and stator coils wound on the salient poles, respectively, each of the stator coils having a common side coil end part and a coil winding part. The common side coil end part of each of the stator coils extends radially outward from corresponding one of the coil winding parts into a region radially outside of the corresponding coil winding part of the corresponding stator coil. Then, the common side coil end part is bent to extend in the circumferential direction towards adjacent one of the salient poles in the circumferential direction, and connects electrically to a common side coil end part of adjacent one of the stator coils, wherein the common side coil end parts are joined to surround in a circular ring-shaped manner an entire outer circumference of the stator core.

14 Claims, 10 Drawing Sheets

Six Common Lines

Fig. 7

Three Common Lines

MOTOR, MOTOR STATOR AND METHOD FOR MANUFACTURING THE SAME

BACKGROUND OF THE INVENTION

1. Field of the Invention

The present invention relates to a motor in which common side coil end parts of stator coils are electrically connected collectively to each other through a common processing. In addition, the present invention relates to a motor stator comprising a plurality of divided cores joined in a circular ring-shaped manner, and more specifically to a motor stator, as well as to its manufacturing method, in which a stator core, comprising divided cores arranged in a circular ring-shaped manner on the inside of a cylindrical motor case, is fixed.

2. Description of Related Art

Generally, in a motor having a plurality of phases, an outside lead-out side end section of a stator coil for each phase wound on a stator core is led out to the outer side for each phase and connected to an outside lead-out terminal, while a common side coil end section at the other end of the stator core for each phase is rendered a so-called common processing, so that each common side coil end section led out for each phase from a winding part of the corresponding stator coil is electrically connected collectively with other common side coil end sections to a common terminal through soldering.

Figure 13:
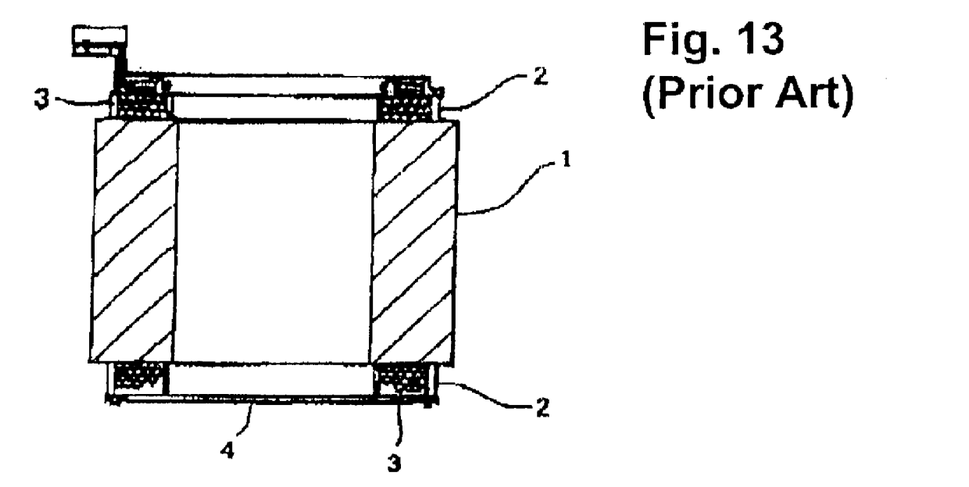
FIG. 13 shows a longitudinal cross-sectional view indicating the structure for a common processing in a general motor.
Figure 14:
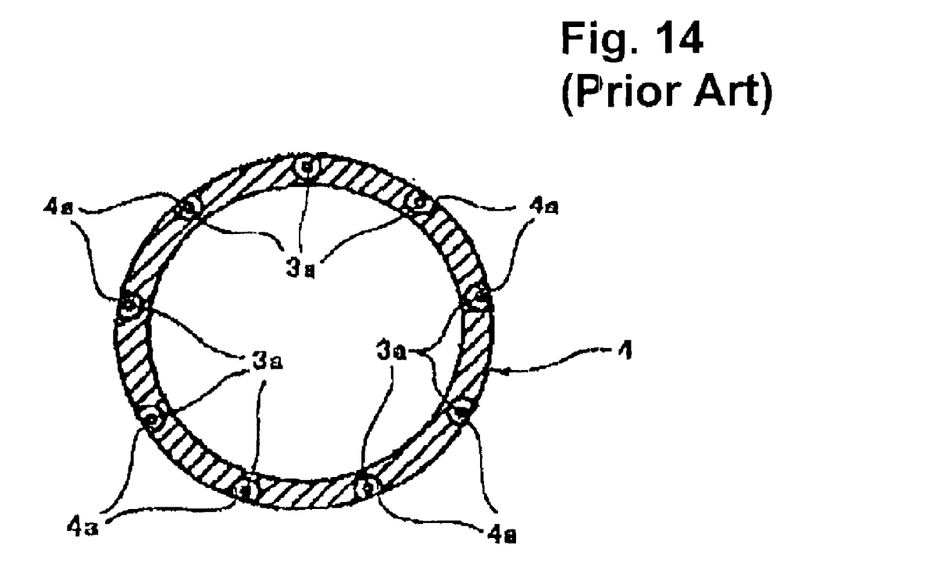
FIG. 14 shows a front view indicating the structure of a common terminal body used in the conventional common processing according to FIG. 13.

For example, in an inner rotor-type brushless DC motor shown in FIG. 13, a stator coil 3 for each phase is wound around a bobbin 2 attached to a stator core 1, and a common side coil end part led out from a winding part of the stator coil 3 is led out towards the bottom of the drawing. In the meantime, at the bottom end side of the bobbin 2 is attached a common terminal body 4, which comprises a ring-shaped connection material as shown in FIG. 14. After each common side coil end part 3a led out towards the bottom is inserted through one of a plurality of holes 4a formed in the common terminal body 4, the common processing is rendered.

Additionally, a known motor stator is composed by joining, in a circular ring-shaped manner, outer circumference parts of divided cores on which salient poles are formed. Compared to winding stator coils around salient poles of a unitary structure core, the winding work is easier and the space factor of the stator coils increases with the divided cores, which improves motor efficiency.

In a motor stator formed from divided cores, a method has been proposed to shrink-fit a ring-shaped body (a motor case) on the outside of divided cores arranged in a circular ring-shaped manner in order to mutually fix the divided cores.

However, the common processing of the stator coils 3 that was in practice conventionally involves a large number of parts, and therefore increases costs, due to the fact that the common terminal body 4 is used. Furthermore, due to the fact that all common side coil end parts 3a that are led out for the common processing must be individually inserted through the holes 4a of the common terminal body 4, workability during assembly is not favorable.

In a conventional method to fix divided cores through shrink-fitting, when the ring-shaped body's inner diameter dimension allowance is large or its precision of out-of-roundness poor, it becomes impossible to press the ring-shaped body around the circular outer circumference surface of the divided cores arranged in a circular ring-shaped manner during shrink-fitting, leading to a possibility of a shrink-fit failure. In order to machine the inner circumference surface of the ring-shaped body to a high precision, NC lace machining must be done, which increases the parts cost.

When the inner circumference dimension of the ring-shaped body that serves to fix the divided cores is large, shrink-fitting is easy since the overall thermal expansion amount is large even at a relatively low temperature. However, when its inner diameter dimension is small, shrink-fitting is difficult since the overall thermal expansion amount is small even when the ring-shaped body is heated to a high temperature. As a result, there is a problem in that shrink-fitting is not suitable when the ring-shaped body has a small inner diameter dimension.

Furthermore, when the ring-shaped body that serves to fix the divided cores is made of a material with high specific heat, such as iron, shrink-fitting is easy since the material does not cool easily. However, when the material has low specific heat and cools easily, such as aluminum, shrink-fitting is difficult. This restricts the material of the ring-shaped body that can be used to fix the divided cores.

SUMMARY OF THE INVENTION

In view of the situation described above, the present invention relates to a motor in which the common processing on a stator core can be performed efficiently with a simple structure. In addition, the present invention relates to a motor stator whose structure allows a plurality of divided cores arranged in a ring shape to be fixed easily from the outside with a motor case.

In order to solve the problems, a motor in accordance with an embodiment of the present invention having a stator core having a plurality of salient poles and stator coils wound on the salient poles, respectively, each of the stator coils defining a coil winding part, wherein a common side coil end part of each of the stator coils extends radially outward from corresponding one of the coil winding parts into a region radially outside of the corresponding coil winding part of the corresponding stator coil, extends in the circumferential direction towards adjacent one of the salient poles in the circumferential direction, and connects electrically to a common side coil end part of adjacent one of the stator coils, wherein the common side coil end parts are joined to surround in a circular ring-shaped manner an entire outer circumference of the stator core.

According to the motor having such a structure, a common processing can be performed by the common side coil end parts themselves, without having to use any independent parts such as a common terminal body that was used in conventional technique. Further, due to the fact that routing around and joining the stator coils are performed on outer circumference parts where the joining can be done easily, the assembly can be performed efficiently.

In the motor in accordance with the present embodiment, the stator coils have a plurality of phases, each of the stator coils may be wound on the corresponding one of the salient poles through an insulator, and the insulator is provided with a coil guide section. Each of the coil guide sections guides the corresponding common side coil end part from the corresponding winding part of the corresponding stator coil in a radial direction outward or in a circumferential direction. Consequently, leading out and/or routing around the common coil end parts of the stator coils can be performed easily and favorably.

In the motor in accordance with the present embodiment, each of the stator coils may have a rigidity such that the stator coil would not be deformed at least by its own weight. Since the stator coils are structured to surround the stator core when the common side coil end parts are led out radially outward from the winding parts and joined, leading out and/or routing around the common side coil end parts of the stator coils are done more securely.

In the motor in accordance with the present embodiment, the stator core may have an arc-shaped main body, which is formed from a plurality of arc-shaped divided cores for each salient pole. The plurality of divided cores may be temporarily fixed together in a ring shape when the common side coil end parts of the stator coils are put together to surround and adhere to the entire circumference of the stator core in a circular ring-shaped manner. Consequently, the stator core can be handled easily and efficiently when mounting the divided cores on a motor case, and no or simple jigs are required to temporarily fix the divided cores to each other.

In the motor in accordance with the present embodiment, due to the fact that the common side coil end parts of the stator coils may be electrically connected to one another through soldering or fuse-bonding. Either method can be used as a means to join the common side coil end parts to one another.

The motor in accordance with the present embodiment may further includes a motor case, and the stator core is composed of a circular ring-shaped stator core arranged on the inside of the motor case. The stator core may be formed from a plurality of divided cores that are arranged in the circumferential direction, and the motor case may have at least one plastically deformed section, which is formed by having at least one part of the outer circumference surface of the motor case pressed inward. The plastically deformed section mutually fix the divided cores to form the circular ring-shaped stator core.

The motor in accordance with the present embodiment, the motor case may be pressed from the outside to form at least one plastically deformed section, which tighten the entire circular inner circumference surface of the motor case in the circumferential direction to thereby mutually fix the divided cores that are arranged in a circular ring-shaped manner along the circular inner circumference surface of the motor case. Consequently, the precision of the inner diameter dimension, as well as of the degree of roundness, of the motor case can be lower compared to those achieved by a shrink-fitting method, which allows the motor stator comprising the divided cores to be manufactured at low cost. Furthermore, unlike in a shrink-fitting method, even if the motor stator has small dimensions, the divided cores can be fixed securely. Moreover, there are few restrictions on the material of the motor case, since the material can be anything that can undergo plastic deformation through pressing.

In the motor stator according to the present invention, it is desirable to form, on an arc-shaped outer circumference surface of at least one of the divided cores, a recessed surface that recesses inward from the arced surface, and to form the plastically deformed section on the motor case that oppose the recessed surface. The divided cores can be fixed together even if the plastically deformed section is not provided on the outer circumference surface of each of all the divided cores.

Each recessed surface may be formed as a flat surface that notches one part of the arc-shaped outer circumference surface of the corresponding divided core. By forming such recessed surfaces, a mechanical engagement between each recessed surface and the corresponding plastically deformed surface on the motor case side forms a rotation stopper mechanism for the motor case and the stator core comprising the divided cores.

The motor case in the motor stator according to the present invention may have a cylindrical shape, and each plastically deformed section can be formed by caulking the motor case from the outside to thereby fix the divided cores together In this case, roller-caulking may be used to form the plastically deformed section along the entire circumference, which securely fixes the divided cores.

In accordance with another embodiment of the present invention, there is provided a method for manufacturing a motor stator having a motor case and a circular ring-shaped stator core arranged on the inside of the motor case, the stator core comprising a plurality of divided cores that are arranged in the circumferential direction, the method comprising the steps of forming at least one plastically deformed section by having at least one part of an outer circumference surface of the motor case pressed inward, and mutually fixing the divided cores by the plastically deformed sections to form the circular ring-shaped stator core.

In the method for manufacturing a motor stator according to the present invention, the motor case may be pressed from the outside to form at least one plastically deformed section, which tightens the entire circular inner circumference surface of the motor case in the circumferential direction to mutually fix the divided cores that are arranged in a circular ring-shaped manner along the circular inner circumference surface of the motor case. Consequently, the precision of the inner diameter dimension, as well as of the degree of roundness, of the motor case can be lower than those that may be achieved by a shrink-fitting method, which allows the motor stators comprising the divided cores to be manufactured at low cost. Furthermore, unlike in a shrink-fitting method, even if the motor stator has small dimensions, the divided cores can be fixed securely. Moreover, there are few restrictions on the material of the motor case, since the material can be anything that can undergo plastic deformation through pressing.

In the manufacturing method for the motor stator according to the present invention, it is desirable to form, on an arc-shaped outer circumference surface of at least one of the divided cores, at least one recessed surface that recesses inward from the arced surface, and to form the plastically deformed section on at least one part of the motor case that opposes the recessed surface. This is due to the fact that the divided cores can be fixed even if the plastically deformed section is not provided on the outer circumference surface of all divided cores.

Each recessed surface may be formed as a flat surface that notches one part of the arc-shaped outer circumference surface of the corresponding divided core. By forming such recessed surfaces, a mechanical engagement between each recessed surface and the corresponding plastically deformed surface on the motor case side forms a rotation stopper mechanism for the motor case and the stator core comprising the divided core.

In the manufacturing method for the motor stator according to the present invention, the motor case may have a cylindrical shape, and each plastically deformed section can be formed by caulking the motor case from the outside to thereby fix the divided cores together.

In this case, roller-caulking may be used to allow the plastically deformed section to be formed along the entire circumference, which securely fixes the divided cores.

Other features and advantages of the invention will be apparent from the following detailed description, taken conjunction with the accompanying drawings that illustrate, by way of example, various features of embodiments of the invention.

BRIEF DESCRIPTION OF THE DRAWINGS

FIGS. 9(a), (b) and (c) are a plan view, a cross-sectional view and a perspective view, respectively, of a motor stator in accordance with an embodiment of the present invention.

DESCRIPTION OF PREFERRED EMBODIMENTS

Referring to FIGS. 1 through 8, a motor in accordance with an embodiment of the present invention will be described in detail below. First, the overall structure of a three-phase inner rotor-type DC brushless motor in accordance with an embodiment of the present invention is described.

Figure 1:
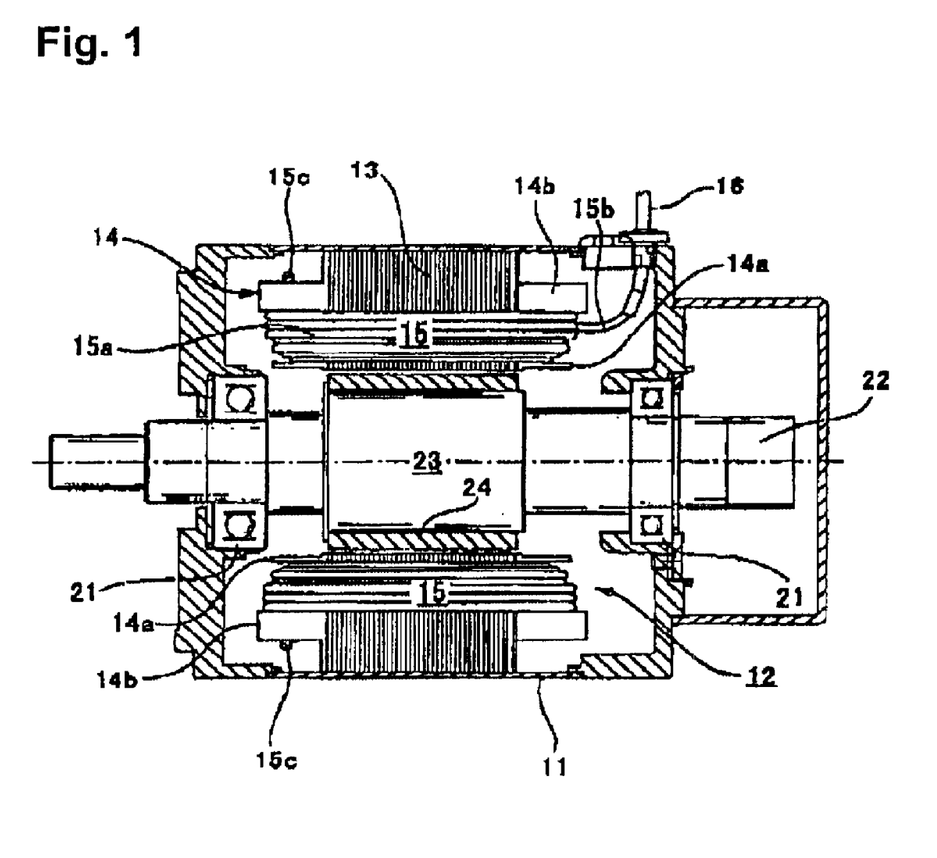
FIG. 1 shows a longitudinal cross-sectional view indicating the overall structure of an inner rotor-type DC brushless motor according to one embodiment of the present invention.
Figure 2:
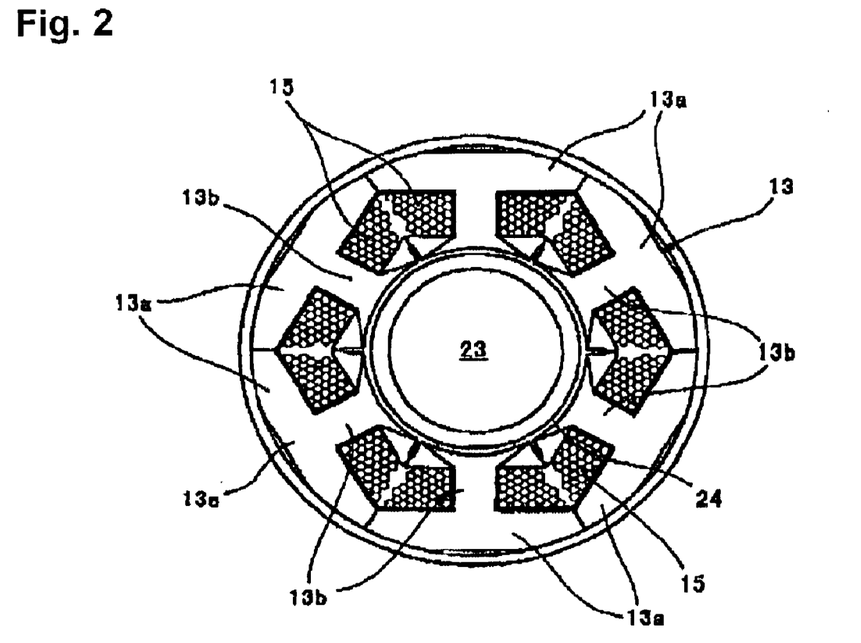
FIG. 2 shows a cross-sectional view indicating the structure of a generally center part in the axial direction of the motor in FIG. 1.

As shown in FIGS. 1 and 2, a three-phase inner rotor-type DC brushless motor of the embodiment of the present invention has a motor case 11 that is formed in a generally hollow cylindrical shape. A motor stator 12 is attached in an adhering manner to a circumferential inner wall surface of the motor case 11. The motor stator 12 is provided with a stator core 13, which comprises multiple magnetic thin plates laminated in the axial direction and which is contained on the inner side of an insulator 14 that is formed in a hollow case shape.

Figure 3:
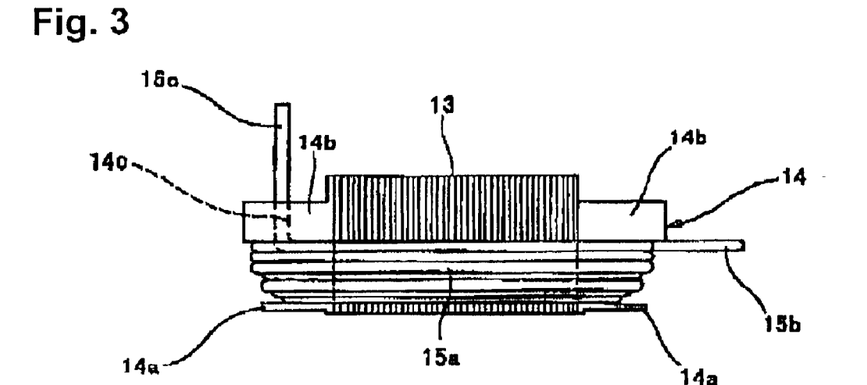
FIG. 3 shows a longitudinal cross-sectional view indicating an enlarged view of one or the divided cores of a motor stator used in FIG. 3.
Figure 4:
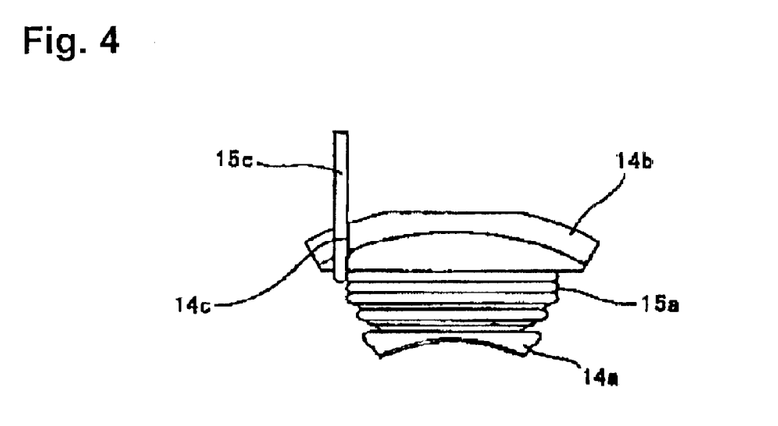
FIG. 4 shows a front view of the divided core of the motor stator in FIG. 3.
Figure 5:
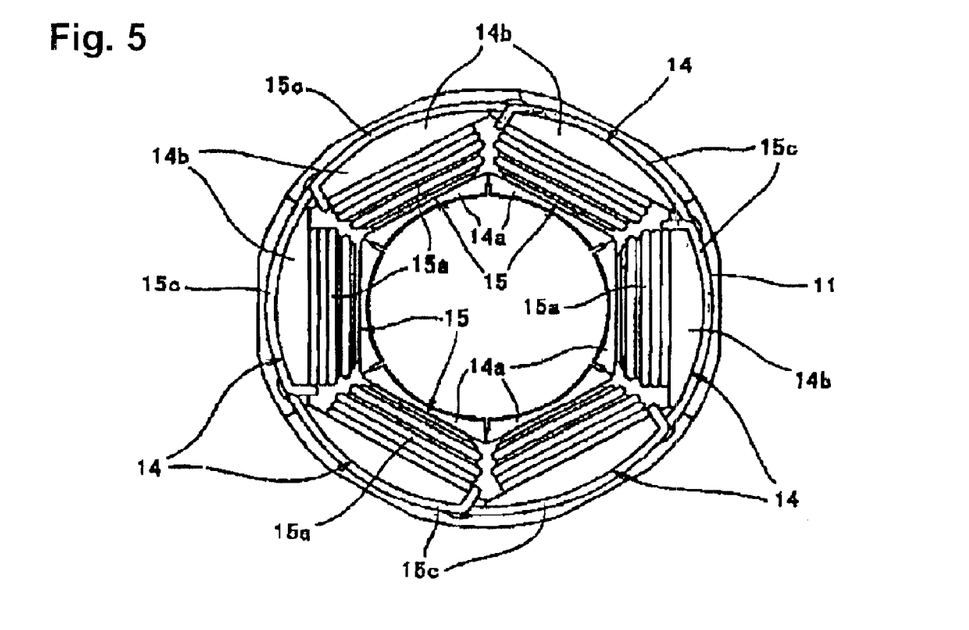
FIG. 5 shows a font view indicating coils routed around and joined after a common processing.

The stator core 13 is provided with a plurality of arc-shaped main body sections 13a, which are mounted in a ring shape against an inner circumference wall surface of the motor case 11, and a plurality of salient pole sections 13b, each of which projects radially towards the center from the corresponding arc-shaped main body section 13a; as indicated also in FIGS. 3, 4 and 5, a core rib section that comprises each of the salient pole sections 13b has a three-phase stator coil 15 wound around it with the insulator 14 intervening between them. In other words, the insulator 14 is mounted to surround the core rib section of each of the salient pole sections 13b in order to insulate the stator coils 15 and the stator core 13 from each other.

In the present embodiment, a divided-type core structure composed of a plurality of divided cores arranged in a ring-shaped is used as the stator core 13. More specifically, the arc-shaped main body sections 13a are divided in the circumferential direction so that each one of the arc-shaped main body sections 13a corresponds to one of the plurality of the salient pole sections 13b every 60 degrees to form each of the divided cores; and a plurality of divided cores (six divided cores in the embodiment shown in FIG. 2) is arranged in a circular ring-shaped manner to adhere to each other along the inner circumference wall surface of the motor case 11. With such a divided-type core structure, winding the stator coils 15 is easy, and the number of turns in the internal space of the motor case 11 is increased.

In the meantime, inner circumference side support walls 14a and outer circumference side support walls 14b are formed on an end edge part on the inner circumference side and on an end edge part on the outer circumference side of the insulator 14, respectively. The inner circumference side support walls 14a and the outer circumference side support walls 14b project in the axial direction from both end surfaces in the axial direction of the stator core 13. Each of the inner circumference side support walls 14a and the outer circumference side support walls 14b is formed to be slightly higher than the winding height in the axial direction of the stator coils 15 in winding parts 15a, and each winding part 15a of the corresponding stator coil 15 is held interposed between the corresponding inner circumference side support wall 14a and the corresponding outer circumference side support wall 14b.

One of a wind beginning part and a wind ending part of each of the winding part 15a of the corresponding stator coil 15 is led out on the right side of FIGS. 1 and 3 as an external lead-out side end section 15b for one of the phases, and the external lead-out end section 15b for each phase is electrically connected to an external lead-out terminal 16 through soldering. The other of the wind beginning part or the wind ending part of each of the stator coils 15 is subject to a common processing according to the present invention, which will be described later.

At the center part on the inner side of the motor case 11 is a shaft 22 positioned in a freely rotatable manner by a pair of bearings 21 and 21, which is positioned at either end part in the axial direction of the motor case 11. At the generally center part in the axial direction of the shaft 22 is a rotor main body 23, and on an outer circumference surface of the rotor main body 23 is attached a circular ring-shaped rotor magnet 24. The rotor magnet 24 is positioned to face each of the salient pole sections 13b of the stator core 13 in a close proximity across an appropriate gap in the radial direction.

Next, we will describe an embodiment of the common processing according to the present invention rendered on each of the stator coils 15.

Figure 6:
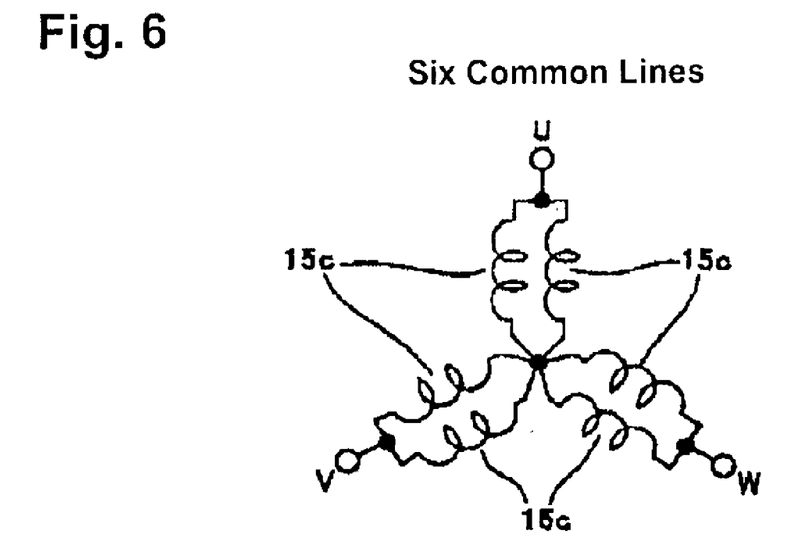
FIG. 6 schematically shows a pattern drawing indicating a common processing structure using a parallel connection method.
Figure 7:
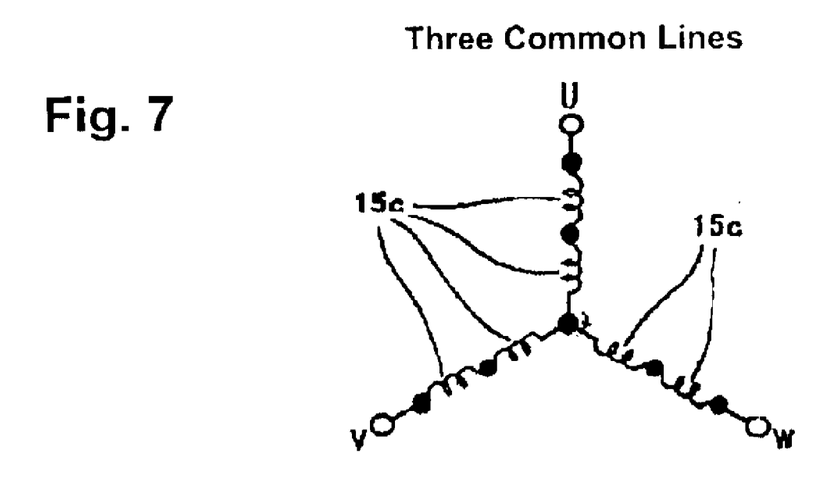
FIG. 7 schematically shows a pattern drawing indicating a common processing structure using a serial connection method.

First, as indicated especially in FIGS. 3, 4 and 5, the common processing involves electrically connecting either the wind beginning parts or the wind ending parts, i.e., the common side coil end parts 15c, of the stator coils 15 collectively for each phase. If there are three phases as indicated in FIGS. 6 and 7, for example, the common side coil end parts 15c corresponding to each of a U phase, a V phase and a W phase are connected in parallel (FIG. 6) or in serial (FIG. 7) in a Y shape through the common processing. The embodiment described below involves parallel connections as in FIG. 6 in a three-phase motor.

In the present embodiment, each common side coil end part 15c, which is led out from the corresponding winding part 15a of the corresponding stator coil 15 for each divided core, bends at a generally perpendicular angle outward in the radial direction to be led out, as shown especially in FIGS. 3, 4 and 5. Each of the common side coil end parts 15c is led out to a region outside of the corresponding outer circumference support wall 14b of the insulator 14.

The outer circumference surface of each of the outer circumference side support walls 14b of the insulator 14 is formed as a curved surface that is generally arc-shaped as viewed in the axial direction, and a coil guide section 14c is provided on one side in the circumferential direction of each outer circumference side support wall 14b such that the coil guide section 14c guides the corresponding common side coil end section 15c. Each of the coil guide sections 14c comprises a groove section that extends outward in the radial direction and whose cross section is generally U-shaped. Each of the common side coil end parts 15c of the corresponding stator coil 15 is led out outward in the radial direction as it is hooked around from the inner side to the outer side in the radial direction along the bottom surface of the groove of the corresponding coil guide section 14c.

Each of the common side coil end parts 15c of the corresponding stator coil 15 that is led out outward in the radial direction from one side in the circumferential direction of the corresponding outer circumference side support wall 14b of the insulator 14 is bent from the radial direction to the circumferential direction, and extends in the circumferential direction as it winds around in a generally arc shape along the outer circumference surface of the outer circumference support wall 14b. In other words, each common side coil end part 15c is routed around to extend toward an adjacent divided core in the circumferential direction, and the end part of the extended common side coil end part 15c is joined through welding or other fuse-bonding means with another common side coil end part 15c, which is similarly led out outward, of another divided core adjacent in the circumferential direction.

Each of the stator coils 15 has a diameter of Φ1.0 or more, for example, which is a relatively large enough diameter that the rigidity of the stator coil 15 would not cause the stator coil 15 to be deformed by its own weight. Consequently, when each of the common side coil end parts 15c is led out outward in the radial direction from the corresponding winding part 15a or routed around in the circumferential direction and joined, the stator coil 15 does not become deformed by its own weight. Due to a certain level of rigidity in the stator coils 15, leading out and routing around the common side coil end parts 15c can be done more easily and securely.

As described above, when the common side coil end parts 15c are joined by fuse-bonding, the common side coil end parts 15c can be electrically connected without removing an insulation film layer on the outer surface of the coils; however, when the joining is done by soldering, the insulation film layer on the coils must be removed in advance.

As a result, a plurality of common side coil end parts 15c, each of which has been led out for one of the divided cores, become joined to encircle in a circular ring-shaped manner along the entire circumference of the stator core 13, which electrically connects each of the common side coil end parts 15c of the stator coils 15 collectively, thereby completing the common processing.

According to a motor in the present embodiment having a structure as described above, the common processing can be done by the common side coil end parts 15c themselves using a simple structure and without having to use any independent parts such as common terminal bodies that were used conventionally. Further, due to the fact that routing around and joining the common side coil end parts 15c are conducted in the outer circumference part, where joining can be done easily, assembly can be done efficiently.

Further according to the present embodiment, due to the fact that each of the coil guide sections 14c that guides the corresponding common side coil end part 15c from the corresponding winding part 15a of the corresponding stator coil 15 outward in the radial direction is provided in the insulator 14, leading out and routing around the common side coil end parts 15c of the stator coils 15 can be done easily and favorably.

Each of the coil guide sections 14c, which guides the corresponding common side coil end part 15c in the circumferential direction along the outer circumference surface of the corresponding outer circumference side support wall 14b of the insulator 14, can be formed in a groove shape. By providing such coil guide sections 14c in the circumferential direction, routing around the common side coil end parts 15c can be even more easily and securely done.

Additionally according to the present embodiment, the stator core 13, which comprises a plurality of divided cores arranged and gathered in a ring-shape, is temporarily fixed by having a structure in which the common side coil end parts 15c of the stator coils 15 surround the entire circumference of the stator core 13 in a circular ring-shaped manner; this makes handling of the stator core 13, which comprises an aggregate of divided cores in a ring-shape, easy and efficient when it is mounted inside a motor case 11. Furthermore, no or simple jigs are required to temporarily fix the divided cores to each other, which leads to a quick assembly with simple equipment.

Figure 8:
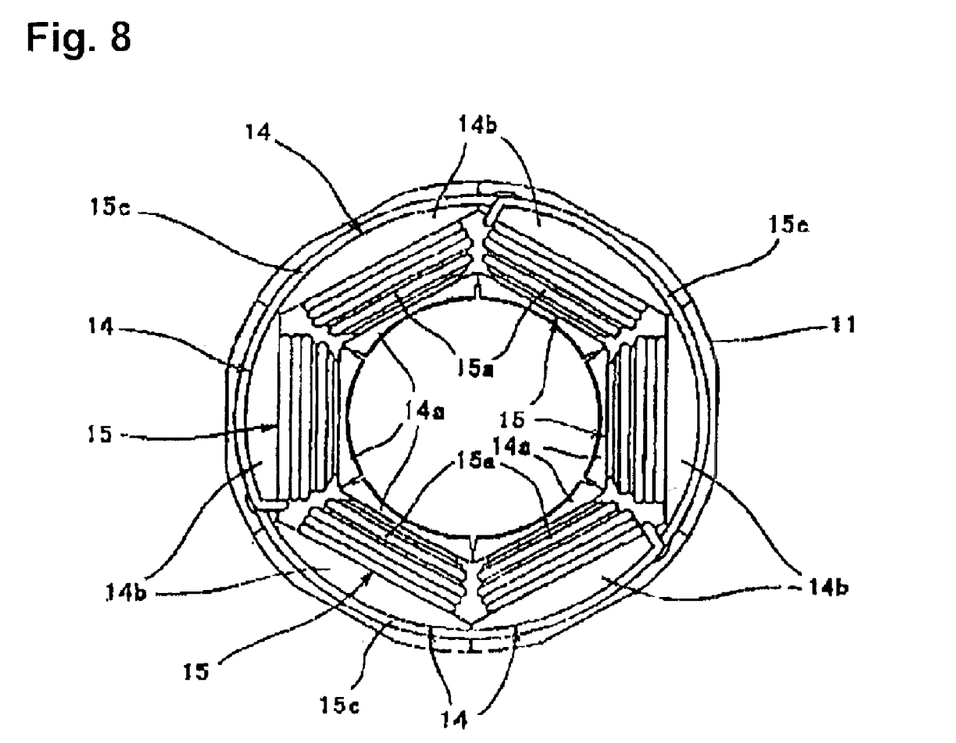
FIG. 8 shows a front view indicating coils routed around and joined after a common processing according to another embodiment of the present invention.
Figure 9:
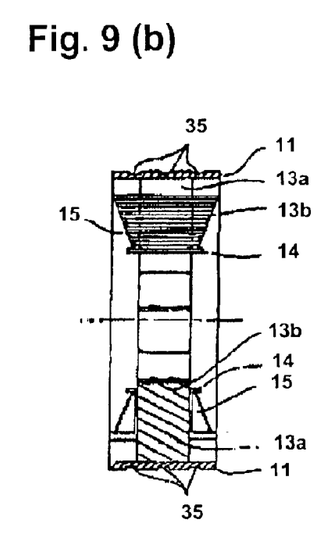
Figure 10:
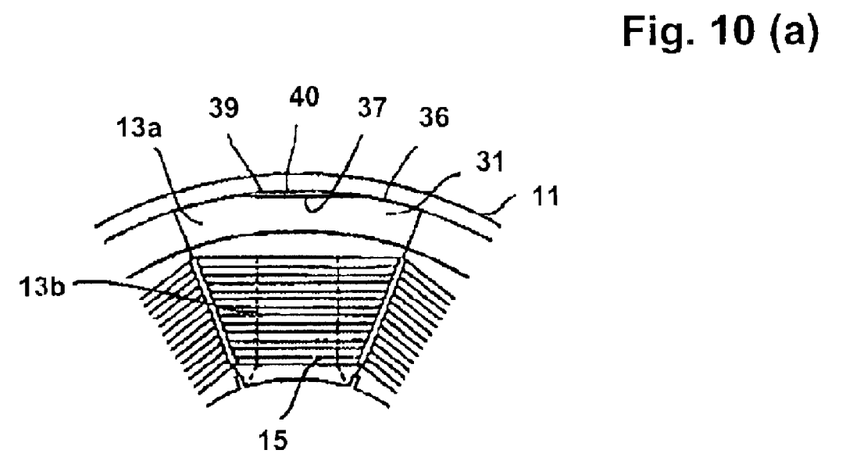
FIG. 10(a) is a partially enlarged plan view of a motor case of a motor stator in FIG. 9 before the motor case is roller-pressed.
FIG. 10(b) is a partially enlarged plan view of the motor case after it is roller-pressed.

FIG. 8 shows another embodiment of the present invention. The embodiment in FIG. 8, where like components are represented by the same numbers as in the earlier embodiment, shows serial connections as in FIG. 7. However, in the present embodiment, common side coil end parts 15c are joined at a total of three locations, one at every other divided core.

The embodiments of the present invention are described above, but many modifications can be made without departing from the present invention.

For example, in each of the embodiments described above, the present invention is applied to a three-phase motor, but the present invention is similarly applicable to motors with different number of phases.

In addition, the present invention is not limited to the inner rotor-type motor as in the embodiments described above, and can be similarly applied to various types of motors, such as an outer rotor-type motor.

Stator coils with high rigidity are easier to handle, but the present invention is applicable even when the coils have low rigidity.

Next, referring to FIGS. 9 through 12, a motor stator in accordance with another embodiment of the present invention is described.

FIGS. 9(a), (b) and (c) are a plan view, a cross-sectional view and a perspective view, respectively, of a motor stator according to the present embodiment. As these figures show, a motor stator 12 has a stator core 13 and a ring-shaped motor case 11 that holds the stator core 13 from the outside.

In the present embodiment, the stator core 13 has nine poles and comprises nine divided cores 31, which are divided for each pole, arranged in a circular ring-shaped manner. Each of the divided cores 31 is provided with an arc-shaped main body 13a with a constant thickness, a single salient pole section 13b that projects towards the center of the arc on the inner circumference surface of the arc-shaped main body 13a, and a stator coil 15 that is wound around the salient pole section 13b with an insulator 14 intervening between them; one salient pole section 13b and one stator coil 15 constitute one salient pole.

Each of the divided cores 31 is arranged in such a way that end surfaces 32 and 33 on the left and right sides, respectively, of the arc-shaped main body 13a abut against the end surfaces of the adjacent divided cores 31, and in this way a circular ring-shaped stator core 13 is formed.

The motor case 11 that holds the stator core 13 comprising the divided cores 31 is a ring-shaped member made of a deformable material such as aluminum, and on its circular outer circumference surface 34 are formed three plastically deformed grooves 35 that extend in the circumferential direction. The plastically deformed grooves 35 are formed by pressing the circular outer circumference surface 34 of the motor case 11 inward by roller-caulking. The stator core 13 comprising the divided cores 31 on the inner side of the motor case 11 is caulk-fixed by the plastically deformed grooves 35.

FIG. 10(b) is a partially enlarged plan view of the motor case 11 and one of the divided cores 31. As FIG. 10(b) shows, on an arc-shaped outer circumference surface 36 of each of the divided cores 31 is provided with a flat surface 37 as a notch in the arc-shaped outer circumference surface 36. Each of the flat surfaces 37 extends orthogonal to a segment drawn in the radial direction through the center position and in the circumferential direction of the corresponding arc-shaped outer circumference surface 36. After roller-caulking, each part of the motor case 11 that opposes one of the flat surfaces 37 becomes a flat plastically deformed section 38 that is in surface contact with the corresponding flat surface 37 of the corresponding divided core 31.

Figure 11:
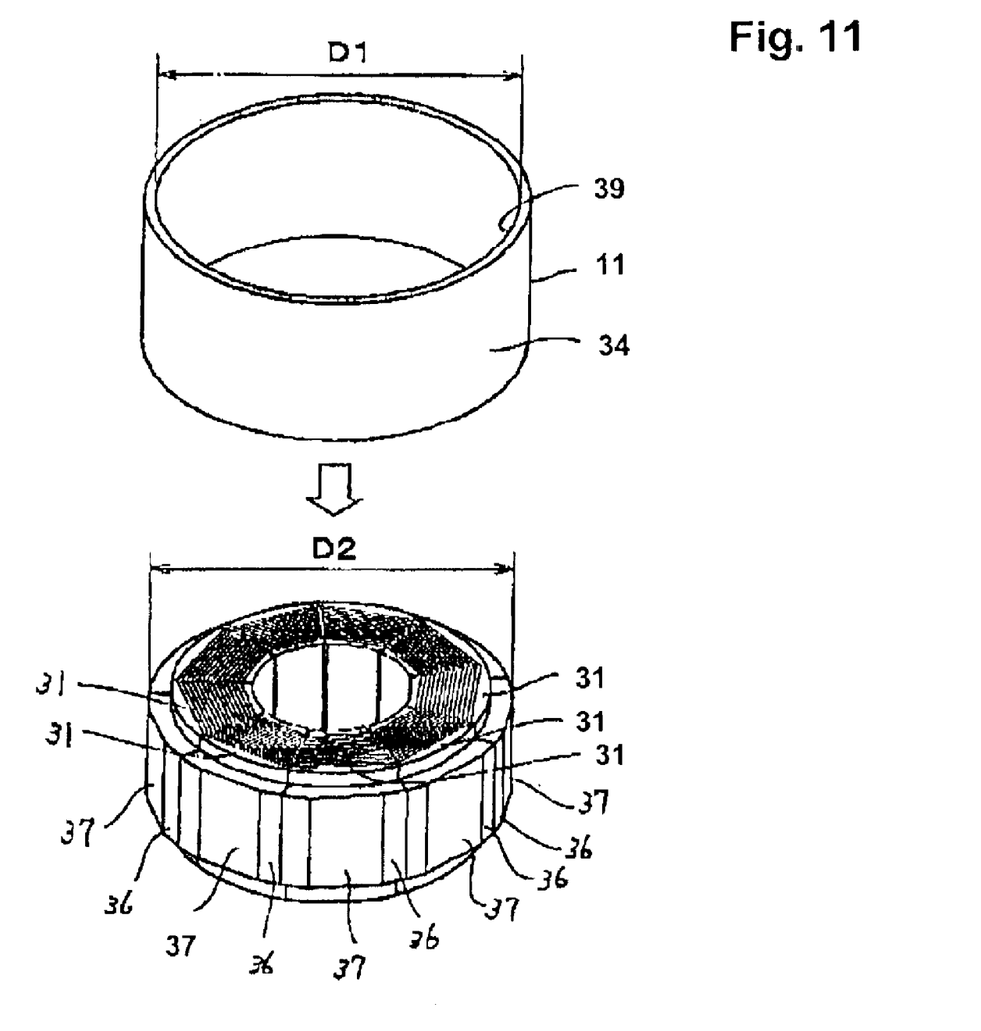
FIG. 11 shows a drawing illustrating the procedure to assemble the motor stator in FIG. 9.

The motor stator 12 having such a structure can be assembled according to the following procedure. First, the circular ring-shaped motor case 11 and the divided cores 31 are manufactured independently from one another. Next, the divided cores 31 are arranged in a circular ring-shaped manner as shown in FIG. 11. The motor case 11 is fitted on the outside of the divided cores 31 arranged in a circular ring-shaped manner. At this time, an inner diameter dimension D1 of the motor case 11 may be set to be the same as, or slightly larger than, an outer diameter dimension D2 of the divided cores 31 arranged in a circular ring-shaped manner. The flat surface 37 may be formed in advance on each of the arc-shaped outer circumference surface 36 of each divided core 31.

FIG. 10(a) is a partially enlarged plan view of a state in which the motor case 11 is fitted on the divided cores 31 that are arranged in a circular ring-shaped manner. As indicated in this figure, each of the flat surfaces 37 that is formed on the corresponding arc-shaped outer circumference surface 36 of the corresponding arc-shaped main body 13a of the corresponding divided core 31 is recessed inward from an arced surface on either side, so that there is a gap 40 formed between the flat surface 37 and a circular inner circumference surface 39 of the motor case 11.

After fitting the motor case 11 on the outer side of the divided cores 31 arranged in a circular ring-shaped manner, the circular outer circumference surface 34 of the motor case 11 is roller-pressed inward at three locations. As a result of this, three plastically deformed grooves 35 that extend in the circumferential direction as shown in FIG. 9(c) are formed. As a result, in the motor case 11 caulk-fixes the divided cores 31 arranged in a circular ring-shaped manner.

After roller-caulking, each part of the motor case 11 that opposes one of the gaps 40 undergoes a drastic plastic deformation inward compared to other parts, due to the fact that the circular outer circumference 34 of the motor case 11 becomes roller-pressed inward, as shown in FIG. 10(b). As a result of this, on each part of the motor case 11 that opposes one of the flat surfaces 37 is formed a flat plastically deformed section 38 that is in surface contact with the corresponding flat surface 37 of the corresponding divided core 31.

By roller-caulking in this way, the motor stator 12, in which the stator core 13 comprising the divided cores 31 arranged in a circular ring-shaped manner is fixed by the motor case 11, can be obtained.

In the motor stator 12 according to the present example, by roller-pressing the outer circumference surface 34 of the motor case 11, inside of which are arranged the divided cores 31, the circular inner circumference surface 39 of the motor case 11 is tightened and the plurality of divided cores 31 arranged in a circular ring-shaped manner become fixed.

Due to the fact that the divided cores 31 are fixed through caulk-fixing in the present example, unlike shrink-fitting ring-shaped bodies as in the past, the inner diameter dimension and degree of roundness of the motor case 11 do not need to be highly precise, which makes machining of parts easy and reduces manufacturing costs.

Furthermore, since there is no need to depend on thermal expansion amount for interference, the divided cores 31 can be securely fixed by the motor case 11 with a small diameter, even if the motor stator 12 has a small diameter. In addition, there are no restrictions concerning the material of the motor case 11, unlike in a shrink-fitting method.

Moreover, in the present example, the flat surface 37, which recesses inward from the arc-shaped outer circumference surface 36, is formed on the are-shaped outer circumference surface 36 of each of the divided cores 31; each of the flat surfaces 37 and the corresponding flat plastically deformed section 38, which is on the motor case 11 and undergoes plastic deformation by being pressed from the outside, form a mechanically engaging section. Each of the engaging sections functions as a rotation stopper between the stator core 13 and the motor case 11, which offers an advantage in that this can improve the fixing strength between the stator core 13 and the motor case 11.

In the example described above, the motor case 11 is pressed along its entire circumference to form the plastically deformed grooves 35 and thereby to caulk-fix the divided cores 31. However, the divided cores 31 on the inside can be fixed by forming plastically deformed sections only in some parts by pressing only those corresponding parts of the motor case 11 from the outside.

Figure 12:
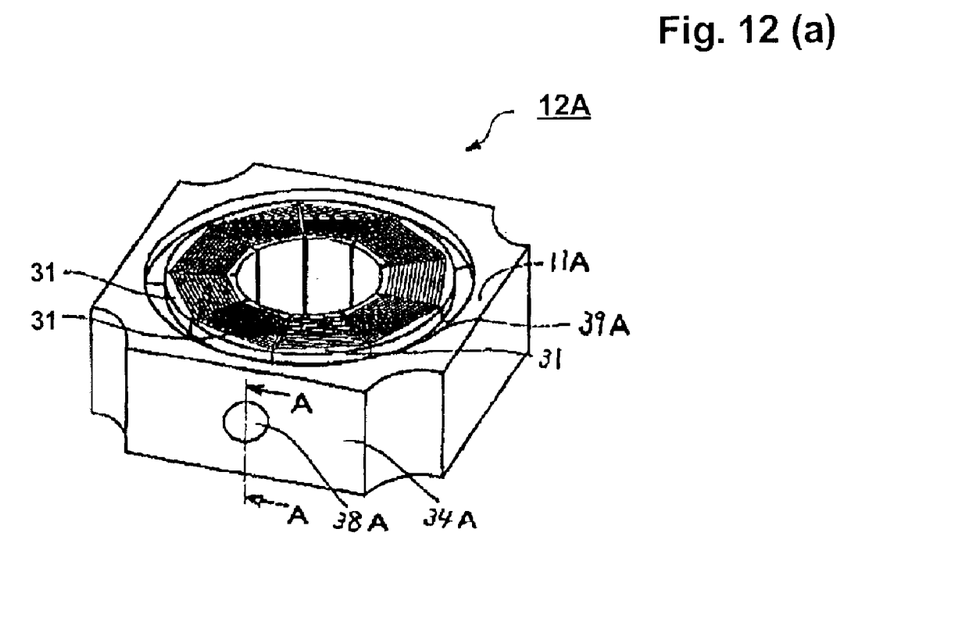
FIG. 12(a) shows a perspective view of a motor stator in accordance with another embodiment of the present invention.
FIG. 12(b) shows a cross-sectional view taken along a line A—A in FIG. 12(a).

For example, divided cores can be fixed by using a motor case shown in FIG. 12. A motor case 11A shown in this figure has a circular inner circumference surface 39A formed on its inside, but its outer contour for the most part is a quadrilateral such as a square with each of the four corners cut away in an arc shape. In this case, roller-caulking as in the previous embodiment cannot be done; instead, for example, a part of one outer circumference side surface 34A of the motor case 11A can be pressed inward to form a plastically deformed section 38A, which tightens the circular inner circumference surface 39A and caulk-fixes divided cores 31.

The divided cores 31 in each of the examples described above are constituted by dividing the stator core 13 for each pole. However, the division can be altered so that the divided cores 31 can be divided for every three poles, for example. On an arc-shaped outer circumference surface of each divided core, there should be a recessed surface that recesses inward from the arced surface at a part that opposes a plastically deformed section of a stator core.

As described above, in a motor according to the present invention, after each common side coil end part of a corresponding winding part of a corresponding stator coil is led out radially outward, it is extended in a circumferential direction towards a salient pole section adjacent in a circumferential direction; each extension end in the circumferential direction of each common side coil end part is connected electrically with the common side coil end part adjacent in the circumferential direction, so that the common side coil end parts are joined to surround in a circular ring-shaped manner the entire outer circumference of a stator core. Consequently, a common processing can be performed by the common side coil end parts themselves using a simple structure and without having to use any independent parts such as a common terminal body that was used conventionally. As a result, the common processing on the stator coils can be performed efficiently and with low cost by using a simple structure, so that the productivity of the motor can be improved without sacrificing the performance or reliability of the motor.

Further, in the motor according to the present invention, an insulator is provided with coil side sections, each of which guides the corresponding common side coil end part from the corresponding winding part of the corresponding stator coil in a radial direction outward or in a circumferential direction; this makes it possible to lead out or route around the common coil end parts easily and favorably, which enhances the effects described above.

In the motor according to the present invention, by securing an appropriate rigidity for the stator coils, the structure is such that the stator coils would not be deformed when the common side coil end parts are led out radially outward from the winding parts and/or joined. Consequently, leading out and/or routing around the common side coil end parts of the stator coils can be conducted more securely, so that the effects described above are even further enhanced.

In the motor according to the present invention, a structure, in which the common side coil end parts of the stator coils surround the entire circumference of the stator core in a circular ring-shaped manner, temporarily fixes the stator core comprising a plurality of divided cores arranged and aggregated in a ring-shape, makes handling of the stator core easy and efficient when mounting the divided cores on a motor case, and requires no or simple jigs to temporarily fix the divided cores to each other; consequently, in addition to the effects described above, the production efficiency of a motor with a divided core-type structure can be improved dramatically.

In the motor according to the present invention, due to the fact that either soldering or fuse-bonding is acceptable as a means to join the common side coil end parts of the stator coils to each other in electrically connecting them, in addition to the effects described above, the selection of a manufacturing means for the motor can be simplified.

In a motor stator according to the present invention, an outer circumference of a motor case is pressed inward to form plastically deformed sections, which tighten a circular inner circumference surface of the motor case and fix a plurality of divided cores that are arranged in a circular ring-shaped manner along the inner circumference surface of the motor case. Consequently, according to the present invention, the precision of the inner diameter dimension, as well as of the degree of roundness, of the motor case does not have to be as stringent as in shrink-fitting, which allows the motor to be manufactured easily and reduces its manufacturing cost. Furthermore, even if the motor stator has a small diameter, the divided cores can be fixed securely. Moreover, restrictions on the material used for the motor case are eased.

In the motor stator according to the present invention, when recessed surfaces are formed on arc-shaped outer circumference surfaces of the divided cores and parts of the motor case that oppose the recessed surfaces are pressed inward to form plastically deformed sections, the plastically deformed sections function as rotation stoppers, which makes the bonding between the motor case and the stator core comprising the divided cores more secure.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a stator core having a plurality of salient poles; and
   stator coils wound on the salient poles, respectively, each of the stator coils defining a coil winding part,
   wherein each of the stator coils has a common side coil end part that extends radially outward from corresponding one of the coil winding parts into a region radially outside of the corresponding coil winding part of the corresponding stator coil,
   the respective common side coil end parts extend in the circumferential direction towards adjacent salient poles, and
   the respective common side coil end parts are electrically connected to the respective neighboring common side coil end parts and arranged to surround an entire outer circumference of the stator core in a circular ring-shaped manner and thus the respective common side coil end parts of the stator coils are electrically connected to each other.

2. A motor according to claim 1, wherein the stator coils have a plurality of phases, each of the stator coils being wound on the corresponding one of the salient poles through an insulator, the insulator having a coil guide section that guides the corresponding common side coil end part from the corresponding winding part of the corresponding stator coil in one of a radial direction outwardly and in a circumferential direction.

3. A motor according to claim 1, wherein the stator core is formed from a plurality of divided core segments arranged in a circular ring-shaped manner, each of the divided core segments having an arc-shaped main body provided with each of the salient poles, wherein the plurality of divided core segments are temporarily fixed together in a ring shape when the common side coil end parts of the stator coils are put together to surround and adhere to the entire circumference of the stator core in a circular ring-shaped manner.

4. A motor according to claim 1, wherein the common side coil end parts of the stator coils are electrically connected to one another through soldering.

5. A motor according to claim 1, wherein the common side coil end parts of the stator coils are electrically connected to one another through fuse-bonding.

6. A motor comprising:

a stator core having a plurality of salient poles; and stator coils wound on the salient poles, respectively, a plurality of the stator coils each having a coil winding part and a common side coil end part, wherein the common side coil end part has a first section that extends radially outward from the coil winding part into a region radially outside of the corresponding coil winding part of the corresponding stator coil, a second section that extends in a circumferential direction towards adjacent one of the stator coils having the common side coil end part in the circumferential direction, and connects electrically to the common side coil end part of the adjacent one of the stator coils.

7. A motor according to claim 6, wherein the common side coil end parts are joined to surround in a circular ring-shaped manner an entire outer circumference of the stator core.

8. A motor according to claim 6, wherein the stator coils have a plurality of phases, each of the stator coils being wound on the corresponding one of the salient poles through an insulator, the insulator having a coil guide section that guides the corresponding common side coil end part from the corresponding winding part of the corresponding stator coil in one of a radial direction outwardly and in a circumferential direction.

9. A motor according to claim 6, wherein the stator core is formed from a plurality of divided core segments arranged in a circular ring-shaped manner, each of the divided core segments having an arc-shaped main body provided with each of the salient poles, wherein the plurality of divided core segments are temporarily fixed together in a ring shape when the common side coil end parts of the stator coils are put together to surround and adhere to the entire circumference of the stator core in a circular ring-shaped manner.

10. A stator core in combination with a stator case that houses the stator core, the stator core comprising a circular ring-shaped stator core arranged on the inside of the motor case, wherein the stator core is formed from a plurality of divided cores that are arranged in a circumferential direction, and the motor case has an inner diameter dimension which is the same as or slightly larger than an outer diameter dimension of the divided cores arranged in a circular ring-shaped manner and has at least one plastic deformation section formed by having at least one part of an outer circumference surface of the motor case formed by being pressed inward and a circular inner circumference surface of the motor case is tightened by the plastic deformation section to thereby mutually fix the divided cores to form the circular ring-shaped stator core.

11. A stator core according to claim 10, wherein at least one of the divided cores has an arc-shaped outer circumference surface including a recessed surface that recesses inward from the arc-shaped outer circumference surface, and the plastically deformed section on the motor case opposes the recessed surface.

12. A stator core according to claim 10, wherein the recessed surface is formed as a flat surface that notches one part of the arc-shaped outer circumference surface of the corresponding divided core.

13. A stator core according to claim 10, wherein the motor case has a cylindrical body, wherein the plastically deformed section is formed by caulking the cylindrical body from outside along the entire circumference of the cylindrical body to thereby fix the divided cores together.

14. A stator core according to claim 10, wherein the plastically deformed section is formed by roller-caulking.

* * * * *